(12) United States Patent
Yang et al.

(10) Patent No.: US 12,215,797 B2
(45) Date of Patent: Feb. 4, 2025

(54) INTERNALLY-SEALED ONE-PIECE EXTERNAL THREAD BALL VALVE

(71) Applicant: YANCHENG TEYI PIPE FITTING SCIENCE & TECHNOLOGY CO., LTD., Yancheng (CN)

(72) Inventors: Shunli Yang, Yancheng (CN); Kun Jiang, Yancheng (CN)

(73) Assignee: YANCHENG TEYI PIPE FITTING SCIENCE & TECHNOLOGY CO., LTD., Yancheng (CN)

(*) Notice: Subject to any disclaimer, the term of this patent is extended or adjusted under 35 U.S.C. 154(b) by 158 days.

(21) Appl. No.: 18/031,941

(22) PCT Filed: Jul. 31, 2020

(86) PCT No.: PCT/CN2020/106186
§ 371 (c)(1),
(2) Date: Apr. 14, 2023

(87) PCT Pub. No.: WO2022/021319
PCT Pub. Date: Feb. 3, 2022

(65) Prior Publication Data
US 2023/0400113 A1    Dec. 14, 2023

(51) Int. Cl.
*F16K 27/06* (2006.01)
*F16J 15/10* (2006.01)
*F16K 5/06* (2006.01)

(52) U.S. Cl.
CPC ........... *F16K 27/067* (2013.01); *F16J 15/104* (2013.01); *F16J 15/106* (2013.01); *F16K 5/0642* (2013.01); *F16K 5/0689* (2013.01)

(58) Field of Classification Search
CPC .... F16K 5/0689; F16K 27/067; F16K 5/0642; F16J 15/104; F16J 15/106
(Continued)

(56) References Cited

U.S. PATENT DOCUMENTS 3,331,581 A * 7/1967 O'Connor ............. F16K 5/0668
251/315.01
4,327,895 A * 5/1982 Blumenkranz ....... F16K 27/067
137/315.19
(Continued)

FOREIGN PATENT DOCUMENTS

CN          2447590 Y      9/2001
CN          2634236 Y      8/2004
(Continued)

*Primary Examiner* — William M McCalister
(74) *Attorney, Agent, or Firm* — Bayramoglu Law Offices LLC

(57) ABSTRACT

An internally-sealed one-piece external thread ball valve includes a valve seat gland and a left sealing gasket. The valve seat gland and the left sealing gasket are installed into a valve body. The contact part of the valve body and the valve seat gland is an internal thread. The contact part of the valve body and the left sealing gasket is a smooth inner circular surface. The left sealing gasket is in an inverted trapezoidal shape with a thin inner part and a thick outer part. The left sealing gasket expand outwards under an action of pressure formed by tightening a left nut during valve assembly. The outer circular surface of the left sealing gasket and a smooth inner circular surface of the valve body form sealing.

14 Claims, 2 Drawing Sheets

(58) Field of Classification Search
USPC .................................. 251/315.14, 314, 317
See application file for complete search history.

(56) References Cited

U.S. PATENT DOCUMENTS

| | | | | |
|---|---|---|---|---|
| 4,605,199 | A * | 8/1986 | Bonissone | F16K 27/067 |
| | | | | 137/328 |
| 4,605,202 | A * | 8/1986 | Tsuno | F16K 5/0626 |
| | | | | 277/609 |
| 4,667,928 | A * | 5/1987 | Davatz | F16K 5/0678 |
| | | | | 251/360 |
| 6,019,349 | A * | 2/2000 | Horne | F16K 27/107 |
| | | | | 285/289.1 |
| 6,361,084 | B1 | 3/2002 | Zarbo | |
| 7,306,010 | B2 * | 12/2007 | Gruener, Sr. | F16K 5/0647 |
| | | | | 251/315.16 |
| 8,439,330 | B2 * | 5/2013 | Xu | F16K 5/0694 |
| | | | | 277/502 |
| 9,091,352 | B2 * | 7/2015 | Fukano | F16K 5/201 |
| 2006/0196567 | A1 * | 9/2006 | Gruener, Sr. | F16K 5/0647 |
| | | | | 251/315.01 |

FOREIGN PATENT DOCUMENTS

| | | |
|---|---|---|
| CN | 2643123 Y | 9/2004 |
| CN | 204717181 U | 10/2015 |
| CN | 105387239 A | 3/2016 |
| CN | 205504068 U | 8/2016 |
| CN | 106352181 A | 1/2017 |
| CN | 107461510 A | 12/2017 |
| CN | 106439313 B | 1/2019 |
| CN | 110792802 A | 2/2020 |
| RU | 2275539 C2 | 4/2006 |
| WO | 2018024174 A1 | 2/2018 |
| WO | 2018072522 A1 | 4/2018 |

* cited by examiner

INTERNALLY-SEALED ONE-PIECE EXTERNAL THREAD BALL VALVE

CROSS REFERENCE TO THE RELATED APPLICATIONS

This application is the national phase entry of International Application No. PCT/CN2020/106186, filed on Jul. 31, 2020, the entire contents of which are incorporated herein by reference.

TECHNICAL FIELD

The present invention relates to the technical field of chemical machinery, and in particular to an internally-sealed one-piece external thread ball valve.

BACKGROUND

The Chinese Patent CN 110792802 A provides a one-piece screw thread ball valve for chemical engineering and for use in movable connection, wherein an outer side of a valve seat gland of the ball valve is made into an inclined plane, an outer side of the left side (close to the ball core) of a valve body is also made into an inclined plane, with the two inclined planes having the same inclined angles, and the valve body, the ball core and the valve seat gland are assembled and then are processed together using a lathe. The sealing surface of the flange of the left loose joint is also made into an inclined plane, and the cross section of the sealing gasket is a trapezoidal shape with a thin outer part and a thick inner part. After loose joints are mounted on the valve, an inclined plane of the valve body at a joint of each loose joint plays a sealing role, an inclined plane of the valve seat gland plays a role of fixing the sealing gaskets, the sealing gaskets expand outwards under an action of internal pressure during use, and a sealing effect is better when the pressure is higher. However, this design also has the disadvantages that the sealing gaskets will be deformed when the pressure is very high, the manufacturing is complex and the requirement is high, namely, sealing inclined planes of the valve body and the valve seat gland are required to be processed only after the valve body and the valve seat gland are mounted, so that the materials are wasted, and the sealing gaskets are large in size, so that the manufacturing cost is high, and in addition, this design is not suitable for high pressure.

SUMMARY

The present invention aims to provide an internally-sealed one-piece external thread ball valve to solve the problems proposed in the background section described above.

An internally-sealed one-piece external thread ball valve is connected to pipelines by loose joints, and the valve includes nuts, connecting pipes, a left sealing gasket, a valve seat gland, a ball core, and a valve body, wherein the left sealing gasket is arranged in the valve body, a contact part of the valve body and the valve seat gland is an internal thread, a contact part of the valve body and the left sealing gasket is a smooth inner circular surface, the left sealing gasket is an inverted trapezoidal ring, the left sealing gasket expands outwards under an action of pressure formed by tightening the nuts during valve assembly, and an outer circular surface of the left sealing gasket and an inner circular surface of the valve body form sealing.

Furthermore, the internally-sealed one-piece external thread ball valve further includes the connecting pipes and the ball core, wherein the valve body is in movable connection with the connecting pipe, outer walls of two ends of the valve body are threads, loose joint parts connected with the two ends of the valve body include the left sealing gasket, the connecting pipes, and the nuts, the left sealing gasket is made of a non-rubber plastic material, a through hole is formed in the ball core, and a diameter of the through hole is equal to an inner diameter of the connecting pipes.

Furthermore, contact surfaces of the valve seat gland and the connecting pipes with the left sealing gasket between the valve seat gland and the connecting pipes are all external conical surfaces, and an included angle between a radial cross section of each of the valve seat gland and the connecting pipes and the corresponding external conical surface is 5-30°.

Furthermore, contact surfaces of the valve seat gland and the connecting pipes with the left sealing gasket between the valve seat gland and the connecting pipes are all external conical surfaces, and an included angle between a radial cross section of each of the valve seat gland and the connecting pipes and the corresponding external conical surface is 5-15°.

Furthermore, the left sealing gasket is made of a plastic material, an inner hole of the left sealing gasket is equal to the diameter of the through hole, front and back radial surfaces of the left sealing gasket are both internal conical shapes, and an included angle between a radial cross section of the left sealing gasket and each internal conical surface is 5-30°.

Furthermore, the left sealing gasket is made of a plastic material, an inner hole of the left sealing gasket is equal to the diameter of the through hole, front and back radial surfaces of the left sealing gasket are both internal conical shapes, and an included angle between a radial cross section of the left sealing gasket and each internal conical surface is 5-15°.

Furthermore, the plastic material is any one of polytetrafluoroethylene, reinforced polytetrafluoroethylene, and para-polyphenyl.

Furthermore, a clearance between the outer circular surface of the left sealing gasket and the smooth inner circular surface of the valve body is 0.05 mm to 0.5 mm.

Furthermore, a clearance between the outer circular surface of the left sealing gasket and the smooth inner circular surface of the valve body is 0.1 mm to 0.3 mm.

Furthermore, a bevel angle between the valve seat gland and the left sealing gasket is equal to a bevel angle between the connecting pipe and the left sealing gasket, and the internal conical surfaces and the external conical surfaces are completely attached after the valve assembly.

Furthermore, the internally-sealed one-piece external thread ball valve has a nominal diameter of a caliber of 8 mm to 65 mm.

Furthermore, the internally-sealed one-piece external thread ball valve has a nominal diameter of a caliber of 10 mm to 50 mm.

Furthermore, the valve is in flange connection or inclined-plane clamp connection with the pipelines, and the internally-sealed one-piece external thread ball valve has a nominal diameter of a caliber of 50 mm to 200 mm.

Furthermore, the valve is in flange connection or inclined-plane clamp connection with the pipelines, and the internally-sealed one-piece external thread ball valve has a nominal diameter of a caliber of 65 mm to 150 mm.

BRIEF DESCRIPTION OF THE DRAWINGS

In order to more clearly illustrate the technical solution in the embodiments of the present invention or in the prior art, the brief description of the drawings required to be used in the embodiments or in the description of the prior art is as follows. It is obvious that the drawings described below are only embodiments of the present invention. For the person skilled in the art, additional drawings can also be obtained from these attached structures without creative effort.

Figure 1:
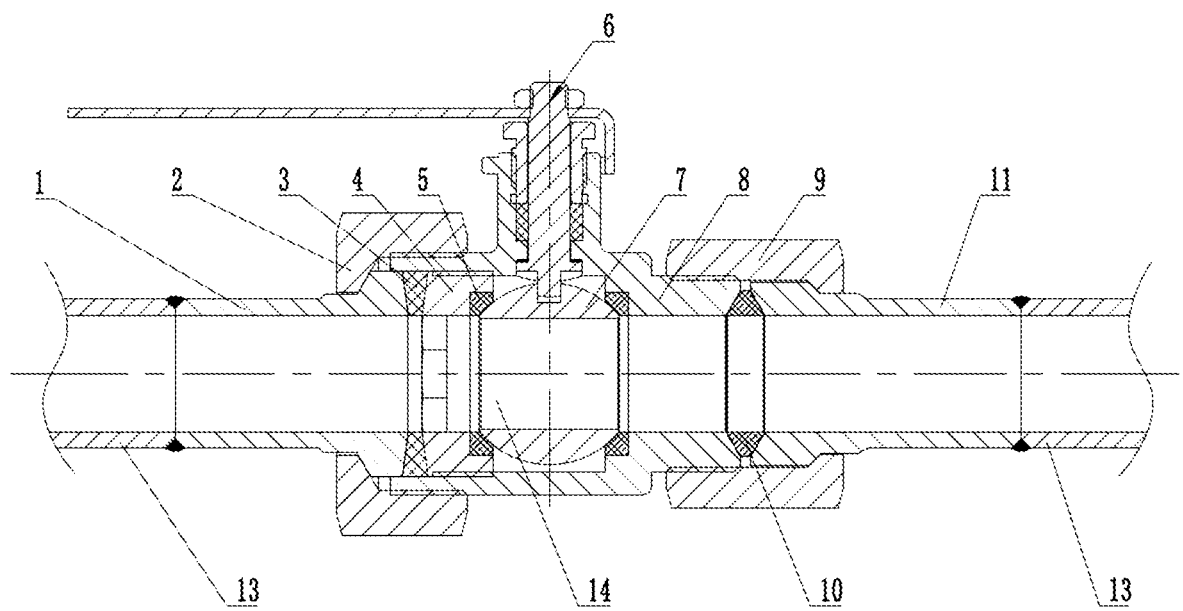
FIG. 1 is a sectional diagram of the internally-sealed one-piece external thread ball valve according to an embodiment of the present invention.
Figures 2A, 2B:
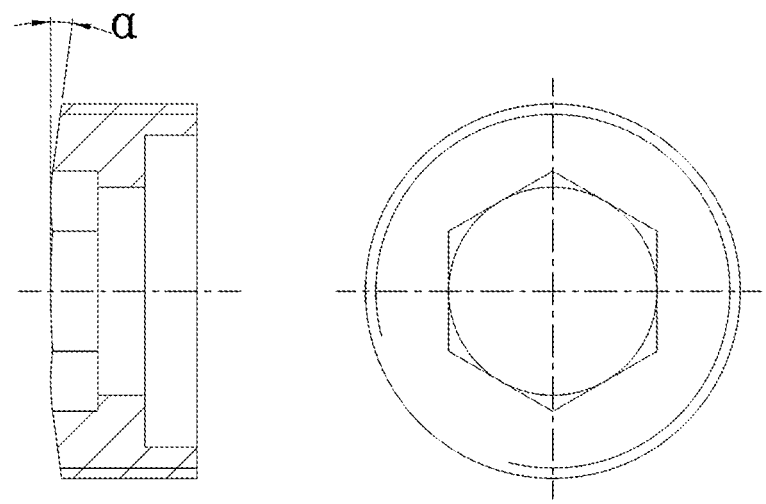
FIGS. 2A and 2B are structural diagrams of the valve seat gland of the internally-sealed one-piece external thread ball valve according to an embodiment of the present invention.

Description of parts is as follows:
1 is left connecting pipe; 2 is left nut; 3 is left sealing gasket; 4 is valve seat gland; 5 is valve seat; 6 is valve stem; 7 is ball core; 8 is valve body; 9 is right nut; 10 is right sealing gasket; 11 is right connecting pipe; 13 is pipeline; and 14 is through hole.

DETAILED DESCRIPTION OF THE EMBODIMENTS

The following examples are intended to illustrate the present invention, but are not intended to limit the scope of the present invention.

Referring to FIGS. 1, 2A-2B, and 3-4, the present invention provides an internally-sealed one-piece external thread ball valve, in which the ball core 7 is connected with the pipelines 13 by welding type loose joints without reducing the diameter. The valve seat gland 4 and the left sealing gasket 3 thereout enter the valve body 8, and the left sealing gasket 3 is an inverted trapezoidal ring. The specific structure is described as follows.

The internally-sealed one-piece external thread ball valve includes connecting pipes, a left sealing gasket 3, a valve seat gland 4, nuts 2 and a valve body 8, wherein the left sealing gasket 3 is arranged in the valve body 8, the contact part of the valve body 8 and the valve seat gland 4 is an internal thread, the contact part of the valve body 8 and the left sealing gasket 3 is a smooth inner circular surface, the left sealing gasket 3 is an inverted trapezoidal ring, the left sealing gasket 3 expands outwards under an action of pressure formed by tightening the nuts 2 during valve assembly, and the outer circular surface of the left sealing gasket 3 and the inner circular surface of the valve body 8 form sealing.

In some embodiments, the internally-sealed one-piece external thread ball valve further includes the pipelines 13, the connecting pipes and the ball core 7, wherein the valve is in movable connection with the pipelines 13, outer walls of two ends of the valve body 8 are threads, loose joint parts connected with the two ends of the valve body 8 include the left sealing gasket 3, the connecting pipes and the nuts, the left sealing gasket is made of a non-rubber plastic material, a through hole 14 is formed in the ball core 7, and a diameter of the through hole 14 is equal to an inner diameter of the pipelines 13. Specifically, the connecting pipes include a left connecting pipe 1 and a right connecting pipe 11, wherein the left connecting pipe 1 enters one side of the ball core 7 from the valve body 8, and the right connecting pipe 11 is positioned on the right side of the valve body 8. The nuts include a left nut and a right nut 9, wherein the left nut is used to fix the left connecting pipe 1, and the right nut 9 is used to fix the right connecting pipe 11. The sealing gaskets include a left sealing gasket 3 and a right sealing gasket 10, wherein the left sealing gasket 3 is positioned between the valve seat gland 4 and the left connecting pipe 1, and the right sealing gasket 10 is positioned between the valve body 8 and the right connecting pipe 11.

The contact surfaces of the valve seat gland 4 and the connecting pipes 15 with the left sealing gasket between the valve seat gland 4 and the connecting pipes 15 are all external conical surfaces, and an included angle between a radial cross section of each of the valve seat gland 4 and the connecting pipes 15 and the corresponding external conical surface is 5-30°, and preferably 5-15°. The front and back surfaces of the left sealing gasket 3 between the valve and the left connecting pipe 1 are both internal conical shapes with its cross section being in an inverted trapezoidal shape, with a thin inner part and a thick outer part, and the included angle (bevel angle) a between a radial cross section of each of the valve seat gland 4 and the connecting pipes 15 and the corresponding internal conical surface is 5-30°, and preferably 5-15°. The left sealing gasket 3 is made of a plastic filler such as polytetrafluoroethylene (PTFE), carbon fiber reinforced polytetrafluoroethylene (CFRP), or para-polyphenyl (PPL). The pore size of the left sealing gasket is equal to the diameter of the ball core 7, with the diameter of the ball core 7 being not reduced, a through hole 14 is formed in the ball core, and the diameter of the through hole 14 is equal to the inner diameter of the pipelines 13.

The valve seat gland 4 is arranged in the valve body 8, the inside of the valve seat gland 4 is in contact with the valve seat 5, and the outside of the valve seat gland 4 is in contact with the left sealing gasket 3. The contact surface of the valve seat gland 4 and the left sealing gasket 3 is an external conical surface, and the included angle (bevel angle) a between a radial cross section of the valve seat gland 4 and the external conical surface is 5-30°, and preferably 5-15°. The hole of the valve seat gland 4 is an inner hexagon, an inner octagon or an inner decagon.

Figures 3, 4:
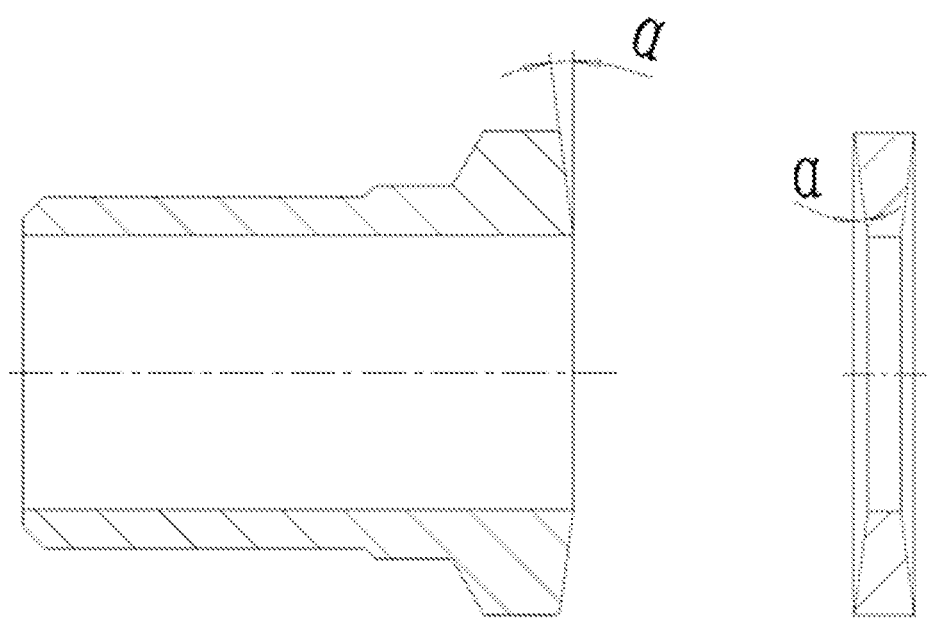
FIG. 3 is a structural diagram of the left connecting pipe of the internally-sealed one-piece external thread ball valve according to an embodiment of the present invention.
FIG. 4 is a structural diagram of the left sealing gasket of the internally-sealed one-piece external thread ball valve according to an embodiment of the present invention.

Referring to FIG. 3, the sealing surface of the flange of the left connecting pipe 1 is an external conical shape, and the included angle (bevel angle) a between the radial cross section of the left connecting pipe 1 and the external conical surface is 5-30°, and preferably 5-15°. The bevel angle between the valve seat gland 4 and the left sealing gasket 3 is equal to the bevel angle between the flange of the left connecting pipe 1 and the left sealing gasket 3, and the internal conical surfaces and the external conical surfaces are completely attached after the valve assembly.

One half of the inside of the left side (close to the ball core during mounting) of the valve body 8 is a smooth inner circular surface (close to the outside), and the other half thereof is an internal thread (close to the inside). The clearance (difference in radius) between the left sealing gasket 3 and the valve body 8 is 0.05 mm to 0.5 mm, and preferably 0.1 mm to 0.3 mm.

During the valve assembly, after the valve seat gland 4 is mounted, the left sealing gasket 3 and the left connecting pipe 1 are sequentially placed into the valve body 8, and then the left nut is mounted. Tightening the left nut will make the left connecting pipe 1 move inwards, and the left sealing gasket 3, due to its special structure of an inverted trapezoidal shape, expands outwards after being extruded, and is close to the smooth inner circular surface of the valve body 8, and when the nuts are tightened, the outer circular surface of the left sealing gasket 3 is attached to the smooth inner circular surface of the valve body 8, forming sealing. At the moment, the valve seat gland 4, the left sealing gasket 3 and the left connecting pipe 1 are also attached together to form sealing. When in use, under the action of the internal pressure, the left sealing gasket 3 expands outwards, making the sealing strengthened.

In some embodiments, the valve body 8 is connected to the pipeline 13 by a loose joint, the internally-sealed one-piece external thread ball valve and the pipeline have a nominal diameter of a caliber of 8 mm to 65 mm, and preferably 10 mm to 50 mm.

In another embodiment, the valve body 8 is in flange connection or inclined-plane clamp connection (CN 106439313 B, WO 2018/024174 A1) with the pipelines 13, and the internally-sealed one-piece external thread ball valve has a nominal diameter of a caliber of 50 mm to 200 mm.

The internally-sealed one-piece external thread ball valve according to one embodiment has the advantages of easiness in machining, low manufacturing cost, reliability in sealing and high pressure resistance. In the present invention, the valve body 8 and the valve seat gland 4 can be respectively manufactured according to the normal valve production procedure, with simplified production process and reduced cost, and in addition, the universality of parts of the valve is good.

In some embodiments, the internally-sealed one-piece external thread ball valve has a lower manufacturing cost than the externally-sealed ball valve. Specifically, firstly, the left sealing gasket 3 are small in size, so that the using amount of sealing materials is small; secondly, the thickness of the valve body 8 can be thinned, for low-pressure external thread ball valve, on the basis of meeting the standard thickness of the valve body, the thickness of the externally-sealed external thread valve needs to be increased in order to ensure sealing surfaces with enough size (on the valve body, the width is 3-4 mm), and however, the internally-sealed one-piece external thread ball valve in this embodiment does not need to do the same; and thirdly, the machining process is simplified during manufacturing, so that the procedures are less. When the externally-sealed external thread ball valve is subjected to a very high pressure, the trapezoidal sealing gaskets may be deformed and then extruded into the threads of the nuts, so that the sealing gaskets cannot reuse, while the internally-sealed one-piece external thread ball valve in this embodiment does not have this problem.

The test result shows that the sealing material adopts carbon fiber reinforced polytetrafluoroethylene with certain elasticity, the usable fit tolerance of the left sealing gasket 3 and the valve body 8 is 0.2-0.8 mm (difference in diameter), the loose joints are disassembled after pressure test, clearances are formed between the left sealing gasket 3 and the valve body 8, the left sealing gasket 3 are easy to take out, and the left sealing gasket 3 can be used repeatedly.

The right side of the valve is connected with the pipelines 13 by using welding type loose joints, and the right sealing gasket 10 is a metal triangular ring (CN 204717181 U) or a metal bow-shaped ring (CN 106352181 A, WO 2018/072522A1), and other sealing gaskets may also be adopted.

The valves currently used in industry have a nominal diameter of a minimum caliber of 15 mm, which is mainly due to the fact that the pipeline is unmatched with the flange of a large size. After the loose joints are popularized in industry, the valve having a nominal diameter of 10 may also be popularized, and therefore, the internally-sealed one-piece external thread ball valve is designed to have a nominal diameter of a caliber of 10 mm to 50 mm. In the prior art, a method for changing the diameter of the valve stem is adopted, the height of a packing box of a screw thread type ball valve is doubled, the packing box is designed according to the standard of a petrochemical ball valve, and a gland is provided with a pressure ring, so that the defect that the packing box of the screw thread type ball valve is not in accordance with chemical and petrochemical requirements is overcome; however, the improvement is designed for a two-piece external thread ball valve, and the valve stem 6 of the internally-sealed one-piece external thread ball valve is more difficult to mount. During design, the problem cannot be overcome by using the internally-sealed one-piece external thread ball valve having a nominal diameter of a caliber of 20 or below and adopting the method for changing the diameter of the valve stem 6, namely, when a packing box is designed according to the standard of petrochemical and industrial ball valves, the valve stem 6 is too long to mount. In order to solve the problem, the valve stem 6 of the ball valves DN20, DN15 and DN10 in this embodiment is designed into two sections, with the two sections being in keyway connection with each other.

The internally-sealed one-piece external thread ball valve in this embodiment may also be used for manufacturing a large-caliber one-piece ball valve. Most of the large-caliber ball valves commercially available in the market at present are two-piece type, and one-piece type is rare. In recent years, an Italian one-piece ball valve appears in the Chinese market, with a nominal diameter of a caliber being 65 mm to 150 mm and the weight being much lighter than a two-piece ball valve, which is popular with chemical plants. If the large-caliber one-piece ball valve is the internally-sealed one-piece external thread ball valve in this embodiment, the manufacture is easier than the sealing of the existing asbestos plate (or stainless steel-graphite wound) flat gasket, and the weight of the valve is lightened. If the inclined-plane clamp connection with the pipelines proposed by the inventor is adopted (CN 106439313 B), compared with the existing two-piece flange ball valve, the weight will be reduced by 50-70%, and the price will be reduced by more than half.

In some embodiments, the internally-sealed one-piece external thread ball valve can be used for low-pressure, medium-pressure and high-pressure inflammable and explosive media. The internally-sealed one-piece external thread ball valve can replace a small-caliber flange ball valve in the chemical industry, with the manufacturing cost of the valve being reduced by 70-80% and the price being reduced by times, so that the internally-sealed one-piece external thread ball valve has great significance in popularization in the chemical industry. Compared with a flange ball valve, the internally-sealed one-piece external thread ball valve is convenient to mount, so that the mounting cost of chemical manufacturing is saved, and the steel is saved, with the steel for valve manufacturing being reduced by 70-80%, which contributes greatly to environmental protection, energy conservation and emission reduction. The internally-sealed one-piece external thread ball valve can be applied in the industries of general chemical industry, petroleum, petrochemical industry, power generation, steel making and the like, and used for process pipelines of heavy industry.

In some embodiments, the sealing material of the DN25 internally-sealed one-piece external thread ball valve is carbon fiber reinforced polytetrafluoroethylene, with the bevel angle $\alpha=7.5°$. A common integral valve stem has a diameter of 9 mm with threads M8 at the upper end. The sealing gasket in movable connection with the right side (connected with the loose joint side) of the valve is a metal bow-shaped ring, with the specification of the nuts of M42×2. The length of the valve body is 75 mm, and the total length of the valve with loose joints mounted at two ends thereof is 183 mm, and the weight of the valve is 1.7 kg. The left side (close to the ball core) of the valve body 8 has an specification of external threads of M52×2 and an specification of internal threads of M44×2, and an inner diameter of the smooth surface of 44 mm. Three types of left sealing gasket 3 are made, the outer diameters thereof are 43.2 mm, 43.5 mm and 43.8 mm respectively, and the clearances between the left sealing gasket 3 and the valve body 8 are 0.4 mm, 0.25 mm and 0.1 mm respectively. After the valve assembly, the valve is tested on a special pressure testing machine for a loose-joint ball valve; the valve is immersed in water, the air pressure is 0.8 MPa, and no bubbles are generated. The valve is taken out from the pressure testing machine and disassembled for observation, wherein there are clearances between the left sealing gasket 3 and the valve body 8, which proves that the sealing gaskets have certain elasticity and can be used repeatedly.

For a stainless steel DN25PN16 flange ball valve in the prior art, flanges are mounted at two ends thereof, bolts are mounted, and the weight is 6.97 kg. The weight of the flange ball valve is 4.1 times of that of the loose-joint ball valve.

In some embodiments, the sealing gasket of the DN15 internally-sealed one-piece external thread ball valve is made of carbon fiber reinforced polytetrafluoroethylene. The valve stem 6 is of an upper-lower segmented structure, the diameter of the valve stem 6 is 9 mm, and the upper-segmented structure is provided with threads M8 at the upper end. The sealing gasket in movable connection with the right side of the valve is a metal bow-shaped ring, with the specification of the nuts of M28×2. The length of the valve body 8 is 40 mm, and the total length of the valve with loose joints mounted at two ends thereof is 154 mm, and the weight of the valve is 1.0 kg. The specification of external threads on the left side of the valve body 8 is M42×2 and the specification of internal threads thereon is M32×2, and the inner diameter of the smooth surface is 32 mm. The outer diameter of the left sealing gasket 3 is 31.5 mm, and the clearance between each left sealing gasket 3 and the valve body 8 is 0.25 mm. After the valve assembly, the valve is tested on a special pressure testing machine for a loose-joint ball valve; the valve is immersed in water, the air pressure is 0.8 MPa, and no bubbles are generated. The valve is taken out from the pressure testing machine and disassembled for observation, wherein there are clearances between the left sealing gasket 3 and the valve body 8, and thus the sealing gaskets can be used repeatedly.

For a stainless steel DN15PN16 flange ball valve in the prior art, flanges are mounted at two ends thereof, bolts are mounted, and the weight is 4.38 kg. The weight of the flange ball valve is 4.3 times of that of the loose-joint ball valve.

The above description is only a preferred embodiment of the present invention, and is not intended to limit the scope of the present invention. All equivalent structural changes made from the specification and the drawings of the present invention, or direct/indirect application of the content of the present invention in other related technical fields under the inventive concept of the present invention, are included in the protection scope of the present invention.

What is claimed is:

1. An internally-sealed one-piece external thread ball valve, comprising connecting pipes, nuts, a left sealing gasket, a valve seat gland, a ball core, and a valve body,
    wherein the left sealing gasket is arranged in the valve body,
    a contact part of the valve body and the valve seat gland is an internal thread,
    a contact part of the valve body and the left sealing gasket is a smooth inner circular surface,
    the left sealing gasket is an inverted trapezoidal ring,
    the left sealing gasket expands outwards under an action of a pressure formed by tightening the nuts during a valve assembly, and
    an outer circular surface of the left sealing gasket and an inner circular surface of the valve body form sealing.

2. The internally-sealed one-piece external thread ball valve according to claim 1,
    wherein the valve body is in a movable connection with the connecting pipe,
    outer walls of two ends of the valve body are threads,
    loose joint parts comprise the connecting pipes, the nuts and the sealing gasket, wherein the loose joint parts are connected with the two ends of the valve body,
    the left sealing gasket is made of a non-rubber plastic material,
    a through hole is formed in the ball core, and
    a diameter of the through hole is equal to an inner diameter of the connecting pipes.

3. The internally-sealed one-piece external thread ball valve according to claim 2, wherein contact surfaces of the valve seat gland and the connecting pipes with the left sealing gasket are external conical surfaces, wherein the left sealing gasket is between the valve seat gland and the connecting pipes, and
    an included angle between a radial cross section of each of the valve seat gland and the connecting pipes and the corresponding external conical surface is 5-30°.

4. The internally-sealed one-piece external thread ball valve according to claim 3, wherein the included angle is 5-15°.

5. The internally-sealed one-piece external thread ball valve according to claim 2, wherein the left sealing gasket is made of a plastic material,
    an inner hole of the left sealing gasket is equal to the diameter of the through hole,
    front and back radial surfaces of the left sealing gasket are internal conical shapes, and
    an included angle between a radial cross section of the left sealing gasket and each internal conical surface is 5-30°.

6. The internally-sealed one-piece external thread ball valve according to claim 5, wherein the included angle is 5-15°.

7. The internally-sealed one-piece external thread ball valve according to claim 5, wherein the plastic material is any one selected from the group consisting of polytetrafluoroethylene, reinforced polytetrafluoroethylene, and para-polyphenyl.

8. The internally-sealed one-piece external thread ball valve according to claim 1, wherein a clearance between the outer circular surface of the left sealing gasket and the smooth inner circular surface of the valve body is 0.05 mm to 0.5 mm.

9. The internally-sealed one-piece external thread ball valve according to claim 1, wherein a clearance between the outer circular surface of the left sealing gasket and the smooth inner circular surface of the valve body is 0.1 mm to 0.3 mm.

10. The internally-sealed one-piece external thread ball valve according to claim 5, wherein a bevel angle between the valve seat gland and the left sealing gasket is equal to a bevel angle between the connecting pipe and the left sealing gasket, and the internal conical surfaces and external conical surfaces are completely attached after ball valve assembly.

11. The internally-sealed one-piece external thread ball valve according to claim 1, comprising a nominal diameter of a caliber of 8 mm to 65 mm.

12. The internally-sealed one-piece external thread ball valve according to claim 1, comprising a nominal diameter of a caliber of 10 mm to 50 mm.

13. The internally-sealed one-piece external thread ball valve according to claim 2, wherein the valve is in a flange connection or an inclined-plane clamp connection with pipelines, and the internally-sealed one-piece external thread ball valve has a nominal diameter of a caliber of 50 mm to 200 mm.

14. The internally-sealed one-piece external thread ball valve according to claim 2, wherein the valve is in a flange connection or an inclined-plane clamp connection with pipelines, and the internally-sealed one-piece external thread ball valve has a nominal diameter of a caliber of 65 mm to 150 mm.

* * * * *